(12) United States Patent
Wheeler et al.

(10) Patent No.: US 9,866,510 B2
(45) Date of Patent: Jan. 9, 2018

(54) COORDINATED NOTIFICATIONS ACROSS MULTIPLE CHANNELS

(71) Applicant: Dropbox, Inc., San Francisco, CA (US)

(72) Inventors: Daniel Lowe Wheeler, San Francisco, CA (US); Tina Wen, San Francisco, CA (US); Aseem Sood, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/243,710

(22) Filed: Aug. 22, 2016

(65) Prior Publication Data

US 2017/0005974 A1   Jan. 5, 2017

Related U.S. Application Data

(63) Continuation of application No. 13/942,650, filed on Jul. 15, 2013, now Pat. No. 9,450,904.

(51) Int. Cl.
*G06F 15/16* (2006.01)
*H04L 12/58* (2006.01)
*H04L 29/08* (2006.01)

(52) U.S. Cl.
CPC .............. *H04L 51/24* (2013.01); *H04L 51/32* (2013.01); *H04L 67/26* (2013.01)

(58) Field of Classification Search
CPC .......... H04L 51/24; H04L 51/32; H04L 67/26
USPC ........................................................ 709/206
See application file for complete search history.

(56) References Cited

U.S. PATENT DOCUMENTS

| 7,509,304 | B1 | 3/2009 | Pather |
| 7,660,864 | B2 | 2/2010 | Markki |
| 7,689,510 | B2 | 3/2010 | Lamkin |
| 7,761,522 | B2 | 7/2010 | Shenfield |
| 7,779,097 | B2 | 8/2010 | Lamkin |
| 7,911,341 | B2 * | 3/2011 | Raji ................ G08B 13/08 340/539.14 |
| 8,315,621 | B2 * | 11/2012 | Lau ................ G06Q 10/109 455/414.2 |
| 8,452,266 | B2 | 5/2013 | Chiu |
| 8,823,507 | B1 | 9/2014 | Touloumtzis |

(Continued)

OTHER PUBLICATIONS

"How Apple can solve the multiple iMessage alert conundrum," by Jeff Benjamin, Apr. 13, 2012, [online], [retrieved on Jan. 13, 2014], retrieved from the Internet: <URL: http://www.idownloadblog.com/2012/04/13/imessage-alert-priority/>, 4 pages.

*Primary Examiner* — Melvin H Pollack
(74) *Attorney, Agent, or Firm* — Polsinelli PC

(57) ABSTRACT

A server system can provide coordinated event-based notifications to a target user across multiple notification channels. The selection of channels for a particular notification can be based on the type of event underlying the notification, user preferences related to delivery of notifications, and the like. The sending of notifications in different channels can be coordinated so that notifications in different channels are sent at different times, and sending of any given notification can be made to depend on whether the notification (or the underlying event) has already been acted on, as well as on user preferences related to delivery of notification. Some notifications can be sent without delay and/or unconditionally.

20 Claims, 9 Drawing Sheets

(56) References Cited

U.S. PATENT DOCUMENTS

| | | | | |
|---|---|---|---|---|
| 8,914,435 | B2 * | 12/2014 | Jeon | G06Q 10/107 |
| | | | | 709/203 |
| 8,914,448 | B2 | 12/2014 | Lee | |
| 8,930,475 | B1 | 1/2015 | North | |
| 8,935,314 | B2 | 1/2015 | Ravichandran | |
| 8,958,747 | B2 | 2/2015 | Baek | |
| 8,990,695 | B2 | 3/2015 | Karachale | |
| 9,053,411 | B2 | 6/2015 | Yach | |
| 9,061,211 | B1 | 6/2015 | Lohstroh | |
| 9,077,676 | B2 * | 7/2015 | Price | H04L 51/30 |
| 9,110,685 | B2 | 8/2015 | Suryanarayana | |
| 9,172,915 | B2 * | 10/2015 | Nicholas | H04N 7/17318 |
| 9,178,994 | B2 * | 11/2015 | Tuchman | H04M 3/51 |
| 9,195,968 | B2 | 11/2015 | Caldwell | |
| 9,418,381 | B2 * | 8/2016 | Ahuja | G06Q 40/02 |
| 9,569,781 | B2 * | 2/2017 | Tuchman | H04L 63/104 |
| 9,706,398 | B2 * | 7/2017 | Frederick | H04W 12/06 |
| 9,729,383 | B2 * | 8/2017 | Sundaresan | H04L 67/306 |
| 2006/0064700 | A1 * | 3/2006 | Ludvig | H04N 5/445 |
| | | | | 719/318 |
| 2010/0049608 | A1 | 2/2010 | Grossman | |
| 2010/0191831 | A1 | 7/2010 | Moon | |
| 2010/0199188 | A1 | 8/2010 | Abu-Hakima | |
| 2011/0026704 | A1 | 2/2011 | Connelly | |
| 2011/0040895 | A1 | 2/2011 | Griffin | |
| 2013/0325922 | A1 | 12/2013 | Chaudhri | |
| 2013/0339436 | A1 | 12/2013 | Gray | |
| 2014/0108143 | A1 | 4/2014 | Davitz | |
| 2014/0156746 | A1 | 6/2014 | Wheatley | |
| 2014/0342705 | A1 | 11/2014 | Harris | |
| 2014/0358632 | A1 | 12/2014 | Graff | |
| 2014/0359476 | A1 | 12/2014 | Wakeford | |
| 2014/0372522 | A1 | 12/2014 | Orona | |
| 2014/0372539 | A1 | 12/2014 | Zaveri | |
| 2017/0164176 | A1 * | 6/2017 | Lieu | H04W 4/22 |

* cited by examiner

| | 502 | 504 | 506 | 508 |
|---|---|---|---|---|
| 510 { | TOPIC FIELDS<br>TYPE ID<br>TARGET OBJECT<br>TARGET USER | ShFolderInvite<br>VacationPhotos<br>Bob | ShFolderInvite<br>VacationPhotos<br>Bob | ShFolderInvite<br>VacationPhotos<br>Bob |
| 512 { | SEQUENCE FIELDS<br>SERIAL NUMBER<br>SEND TIME<br>FEED TIME | 111368<br>01/01/13 00:37:23<br>01/01/13 00:37:23 | 111417<br>01/01/13 07:35:30<br>01/01/13 07:35:30 | 111499<br>01/01/13 07:48:49<br>01/01/13 07:35:30 |
| 514 { | CONTENT FIELDS<br>PAYLOAD<br>ORIGIN USER<br>ORIGIN APP<br>STATUS | <data><br>Alice<br>browser<br>Unread | <data><br>Bob<br>mobile app<br>Read | <data: accept><br>Bob<br>mobile app<br>Invisible |

*FIG. 5*

| | 602 | 604 | 606 | 608 |
|---|---|---|---|---|
| 612 { | METADATA<br>TYPE ID<br>EVENT ID<br>TARGET USER<br>ORIGIN USER<br>TIMESTAMP | ShFolderInvite<br>111368<br>Bob<br>Alice<br>01/01/13 00:37:23 | ShLink<br>12639<br>Kay<br>Bob<br>02/02/13 11:22:33 | QuotaFull<br>12998<br>Bob<br>Curt<br>02/02/13 14:15:17 |
| 610 { | CONTENT FIELDS<br>PAYLOAD | <email msg> | <email msg> | <email msg> |

*FIG. 6*

COORDINATED NOTIFICATIONS ACROSS MULTIPLE CHANNELS

CROSS-REFERENCE TO RELATED APPLICATIONS

This application is a continuation of U.S. application Ser. No. 13/942,650, entitled, "COORDINATED NOTIFICATIONS ACROSS MULTIPLE CHANNELS", filed on Jul. 15, 2013, which is hereby expressly incorporated herein by reference in its entirety.

BACKGROUND

The present disclosure relates generally to online content management services and in particular to providing notifications from such services via multiple channels in a coordinated manner.

Online content management services allow users to access and manage content across multiple devices using the Internet. In a typical online content management service, a user establishes an account with the service provider and can associate various content items with the account. For example, some online content management services may allow the user to store content items (including but not limited to text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices. Users may also be able to receive updates based on activity of other users; for instance, in a social network, status updates or other content items posted by one user can be propagated to other users who have indicated interest in receiving them.

With the proliferation of mobile computing devices, a user can now access the same online content management service from a variety of clients, such as web browsers, desktop application programs, and mobile-device apps. The online content management service provider can provide notifications of events to the user via various clients.

SUMMARY

Certain embodiments of the present invention relate to providing coordinated event-based notifications to a user across multiple notification channels. The events can relate to activity at an online content management service, such as adding, modifying, or deleting content items; invitations to share access to content items; account activity such as payment processing, storage quota updates, or settings changes; and so on. Notifications of various events can be delivered to an affected user (referred to herein as a "target" user) via any combination of channels, including but not limited to client-specific channels such as push notifications and/or user-specific channels such as email.

Where multiple notification channels are available, notifications can be selectively routed to different channels. The selection of channels for a particular notification can be based on the type of event underlying the notification, user preferences related to delivery of notifications, and the like. Further, the sending of notifications in different channels can be managed so that notifications in different channels are sent at different times, and sending of any given notification can be made to depend on whether the notification (or the underlying event) has already been acted on, as well as on user preferences related to delivery of notification. Some notifications can be sent without delay and/or unconditionally.

Certain embodiments relate to methods of notifying a target user of an event that can be executed at a server system that includes one or more servers. The server system can receive event data that identifies a target user. In response to the event data, the server system can generate at least two notifications for the target user, to be sent via two different notification channels (e.g., a push notification to a client device of the target user and an email message to the target user's email address). At least one notification (e.g., the push notification) can be sent in real time while at least one other notification (e.g., the email notification) is queued. At a later time (e.g., after a specified hold time such as five minutes, fifteen minutes, thirty minutes, one hour, or the like, has elapsed), the server system can determine whether the target user has acted on the previously-sent notification (or on the underlying event). If the target user has not acted on the first notification, the queued notification can be sent. If the target user has acted on the first notification, sending of the queued notification can be canceled, e.g., by removing the notification from the queue without sending a corresponding message.

Notifications can relate to various types of events, and whether the target user has acted on a notification can depend on event type. For example, if the event corresponds to an invitation to the target user to share access to a content item with an originating user, the target user can act on a notification by either accepting or declining the invitation. As another example, if the event corresponds to an originating user providing a shareable link to a content item with the target user, the target user can act on a notification by using the shareable link to access the content item. In some embodiments, a queued notification can be queued together with metadata that can be used to determine whether the user has acted on the notification. For instance, the server system can use the metadata to query an event log and/or a notification data store to determine whether the user has acted on the notification.

Certain embodiments relate to server systems capable of generating event notifications. For example, a server system can include a notification server, at least two notification queues to store notification messages for various notification channels, and at least two dispatch servers having a processor and a memory. The notification server can be configured to receive event data and generate notification messages for the various queues in response to the event data. The notification messages can be queued in the notification queues, and each dispatch server can process a different notification queue, independently of other dispatch servers. For example, a first dispatch server can process its queue in real time (without intentional delay) and send a first notification to the target user. A second dispatch server can process its queue after a delay (e.g., a hold time that can be established globally or per-notification) and to send a queued notification of an underlying event only if the target user has not acted on the first notification or on the underlying event. The different dispatch servers can send notification messages via different notification channels; for instance, the first dispatch server can send a push notification to a client device associated with the target user, and the second dispatch server can send an email message to an email address associated with the target user.

The following detailed description together with the accompanying drawings will provide a better understanding of the nature and advantages of the present invention.

BRIEF DESCRIPTION OF THE DRAWINGS

FIG. 5 shows examples of notification records according to an embodiment of the present invention.

FIG. 6 shows examples of email records according to an embodiment of the present invention.

DETAILED DESCRIPTION

Certain embodiments of the present invention relate to providing coordinated event-based notifications to a user across multiple notification channels. The events can relate to activity at an online content management service, such as adding, modifying, or deleting content items; invitations to share access to content items; account activity such as payment processing, storage quota updates, or settings changes; and so on. Notifications of various events can be delivered to an affected user (referred to herein as a "target" user) via any combination of channels, including but not limited to client-specific channels such as push notifications and/or user-specific channels such as email.

Where multiple notification channels are available, notifications can be selectively routed to different channels. The selection of channels for a particular notification can be based on the type of event underlying the notification, user preferences related to delivery of notifications, and the like. Further, the sending of notifications in different channels can be managed so that notifications in different channels are sent at different times, and sending of any given notification can be made to depend on whether the notification (or the underlying event) has already been acted on, as well as on user preferences related to delivery of notification. Some notifications can be sent without delay and/or unconditionally.

Figure 1:
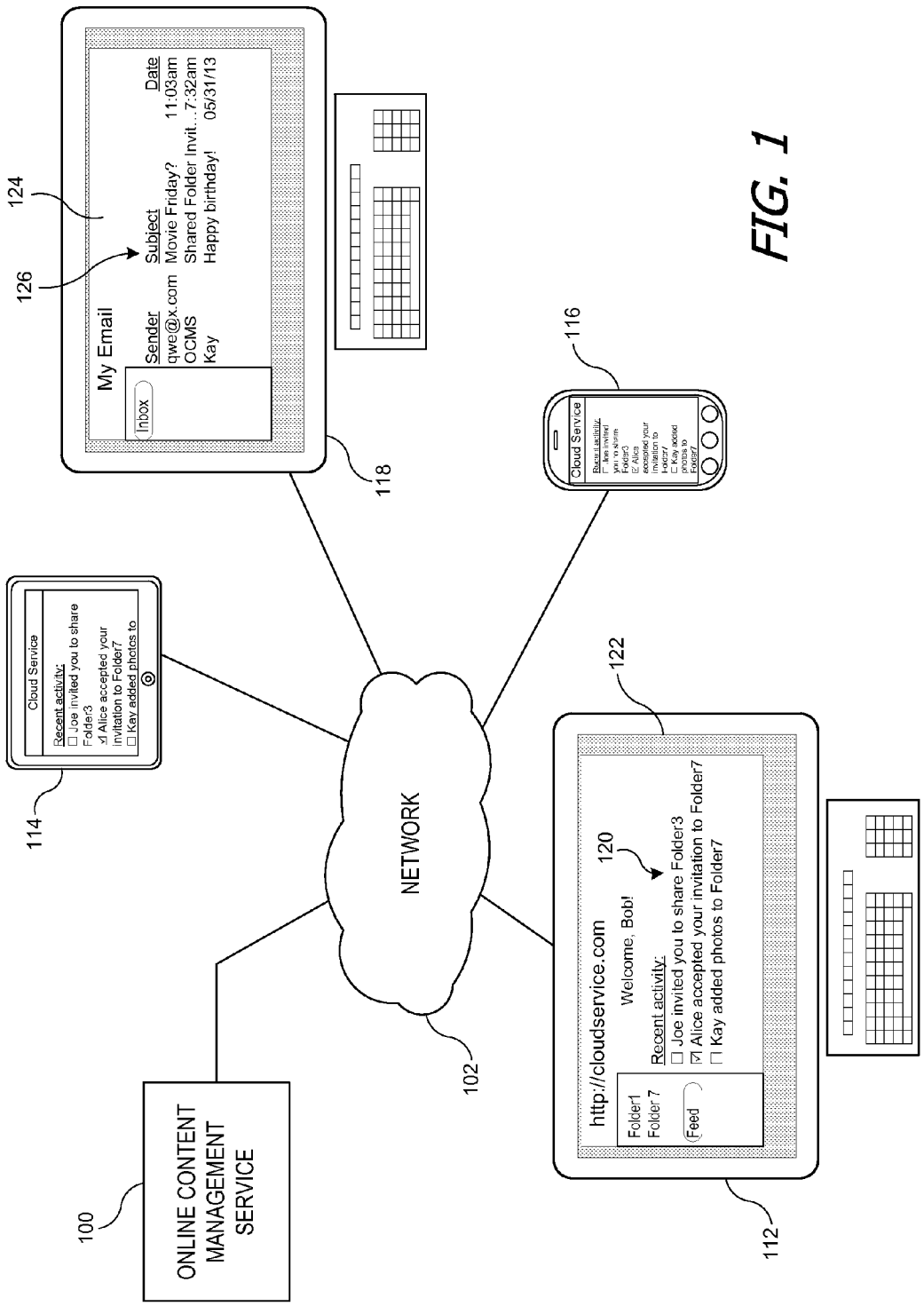
FIG. 1 shows clients accessing an online content management service according to an embodiment of the present invention.

FIG. 1 shows clients accessing an online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via a network 102, such as the Internet.

Users can access online content management service 100 by operating various clients 112, 114, 116. As used herein, a "client" refers generally to a combination of computer hardware and software that enables a user to interact with online content management service 100. For example, client 112 can be a desktop or laptop computer executing a web browser (e.g., Internet Explorer, Google Chrome, or Safari) that communicates with online content management service 100 using web protocols such as HTTP (Hypertext Transfer Protocol). Another type of desktop-based client (not shown) can be a desktop or laptop computer executing an application program provided by the provider of online content management service 100. In some instances where the online content management service provides access to files, the application program may allow files hosted on a server to appear to exist within a file system structure associated with the client computer's operating system. It should be noted that in some instances the same client computer can execute both a web browser and a desktop application program; accordingly, it is to be understood that a single physical device can implement one or more clients.

Other examples of clients include mobile devices, e.g., tablet computer 114 and mobile phone 116, which can execute application programs (also referred to as "apps") that communicate with online content management service 100. At various times, a user may be interacting with one or more of clients 112, 114, 116.

In some embodiments, online content management service 100 can provide notifications of events that may be of interest to the user and/or to the client(s). As used herein, an "event" can include any type of activity associated with the user. For instance, if the user has access to a shared folder that contains files and another user modifies a file in the shared folder, online content management service 100 can provide a notification. As another example, a second user may offer the user an opportunity to share content, e.g., by inviting the user to "join" a shared folder created or managed by the second user. In some embodiments, event notifications are provided to all clients 112, 114, 116 associated with the user, regardless of which client(s) the user is currently interacting with.

Subsequently to being notified of an event, the notified user (or another user) may take action with regard to the event, and this action may constitute another event. For example, in response to receiving an invitation to join a shared folder, the user may accept or decline the invitation, or the inviting user may withdraw the invitation before the recipient user can accept. These actions may constitute further events for which notifications can be generated.

As used herein, a "notification" refers generally to event-related information provided by a service to a user. Notifications can be sent to a specific client (e.g., any or all of clients 112, 114, 116) or sent to the user via a non-client-specific channel, such as by sending an email to an email address linked to the user's account.

In some embodiments, a client may make some or all of its received notifications visible (or perceptible) to the user. For example, the client may display a visual indicator that a notification has been received, display text descriptive of the notification (e.g., "Joe invited you to share Folder3"), play a sound, vibrate, speak words descriptive of the notification, and so on. The term "alert" is used herein to refer to a user-visible (perceptible) form of a notification.

In some embodiments, in addition to or instead of individual event notifications, any or all of clients 112, 114, 116 can provide a notification feed to the user. As used herein, a "notification feed" (or simply a "feed") is a list of event-related alerts. An example feed 120 is shown in display 122 of client 112. The feed can be a chronologically ordered listing of alerts and can include various indicia to inform the user as to the content and/or status of each notification. The feed can be a "flexible" feed in which alerts pertaining to the same topic are consolidated, or folded, e.g., so that the feed presents only the most recent alert related to the same topic. By way of illustration, feed 120 includes an alert that "Joe invited you [user Bob] to share Folder3." If user Bob accepts Joe's invitation, feed 120 can be updated to hide the replace the displayed alert with "You accepted Joe's invitation to share Folder3," or the displayed alert can be hidden. As another example, as a user Kay uploads photos to a shared folder, each new photo may generate an event notification, while feed 120 presents a single alert such as "Kay added photos to Folder7."

A feed can be presented on any or all of clients 112, 114, 116, and the feeds presented on different clients can be synchronized or coordinated. For example, online content management service 100 can "push" notifications to clients 112, 114, 116.

In addition to the notification feeds, users can receive notifications via other channels; these can include client-independent channels such as email services. For example, desktop computer 118 is shown as executing an email application 124 that presents to the user a listing of email messages 126. The email messages can include emails sent from the online content management service (OCMS) to an email address associated with a particular user's account; such emails can include notifications of events such as invitations from another user to share a folder or invitations to view content using a shareable link created by another user. The user can read the email using any device that is capable of accessing emails sent to the relevant email address; this may or may not be a device that also executes an online content client application as described above. (Email is referred to herein as an example of a client-independent notification channel, meaning that the notification is directed to the user rather than to a particular client or device; this can be contrasted with "client-specific" notification channels, such as push notifications that are directed to specific devices or clients that are associated with the user.)

As FIG. 1 illustrates, a notification of the same event can be set to multiple clients and/or through multiple channels. Thus, a user may be notified of the same event multiple times. In some embodiments of the present invention, multiple notifications of the same event can be coordinated, for instance by sending notifications via different channels at different times and making the sending of later notifications of a given event dependent on whether the user has acted on a previously-sent notification. In a specific example, when an event occurs, a notification can be sent in real time (i.e., without any intentional delay) to the user's clients via a push notification service. At the same time an email notification to the user's email address can be generated and queued. Prior to sending the email, the service can wait for some specified time period (e.g., 5 minutes, 30 minutes, 1 hour, etc.). At the end of the time period, the email can be sent if the user has not acted on the push notification.

Figure 2:
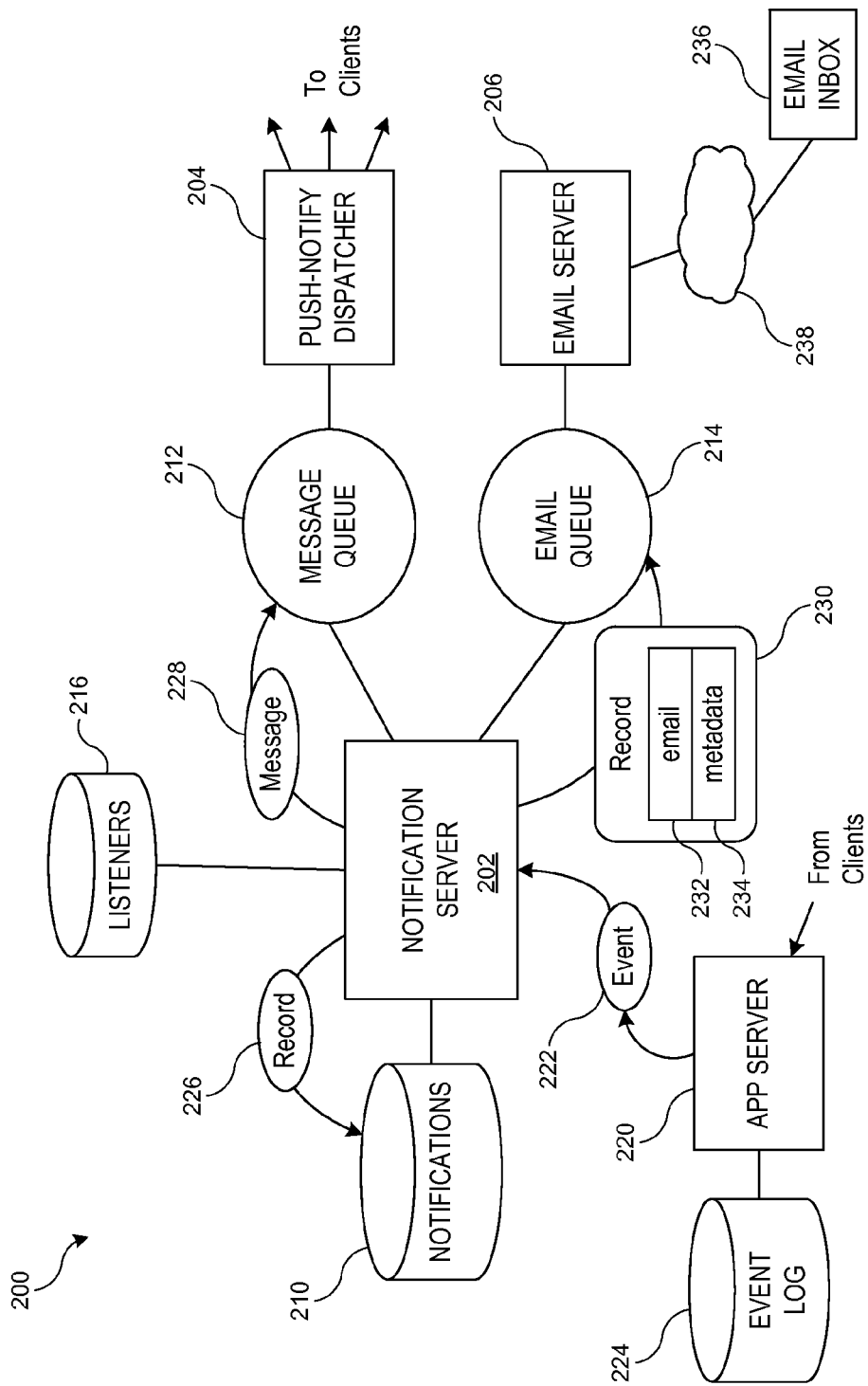
FIG. 2 shows a system for sending notifications according to an embodiment of the present invention.

FIG. 2 shows a system 200 for sending notifications, including push notifications and email notifications, according to an embodiment of the present invention. System 200 includes a notification server 202, push notification dispatcher 204, and email dispatcher 206, all of which can be implemented on servers (or other computer systems) maintained and/or operated by a provider of online content management service 100 of FIG. 1. Notification server 202 is communicably coupled to a notifications data store 210. Notification server 202 also maintains a message queue 212 that is accessible by push notification dispatch server 204 (also referred to as a push-notification dispatcher) and an email queue 214 that is accessible by email dispatch server 206 (also referred to as an email server).

Notification server 202 can perform operations related to generating event notifications and promulgating these notifications to clients and/or users, examples of which are described below. In some embodiments, notification server 202 can be implemented as one or more software (code) modules executing on suitable computer hardware, such as a server. In some instances, notification server 202 can be physically or logically distinct from other servers that perform operations related to other aspects of the online content management service such as content management (e.g., file storage and retrieval) and/or user account management (e.g., creating and updating user accounts, billing, etc.).

Listeners data store 216, which can be implemented, e.g., using a database or any other data storage technology and a suitable computer-readable storage medium, can include information identifying specific client devices and/or clients and/or other contact information associated with a particular user. For example, a particular user with the username "Bob" may have a desktop application program installed on his home computer (e.g., client 112), a tablet running the iOS® operating system (a product of Apple Inc.) (e.g., client 114), a mobile phone running the Android® operating system (a product of the Open Handset Alliance) (e.g., client 116). Listeners data store 212 can provide identifying information for each of these clients when queried with the username "Bob." Listeners data store 216 can be populated by the online content management service based on communications from various clients; for example, when user Bob first signs in to the online content management service from a particular client, notification server 202 (or another server associated with the online content management service) can create a record in listeners data store 212 associating username "Bob" with that client. Listeners data store 212 can also include contact information usable to contact user Bob via other channels, e.g., an email address, a username on an instant messaging service or social networks, a phone number usable to receive text messages and/or phone calls, or the like.

Notification server 202 can be capable of detecting an event for which a notification should be generated. In some embodiments, events can be detected based on event information 222 sent to notification server 202 by other servers associated with the online content management service. For example, an application server 220 can communicate with various clients (e.g., as described above) operated by users, to provide the clients with access to content items stored on the online content management service. For example, application server 220 can support adding, modifying, or deleting content items stored in a content repository of the online content management service; establishing sharing of content items between users based on requests from clients; creating and managing shareable links that one user can create and use to share viewing access to content items with other users by providing the shareable link to the other users; and so on. In the course of communicating with clients, application server 220 can send event information 222 to notification server 202. Application server 220 can also maintain an event log 224 that can be used to provide and update event information, including, e.g., whether a user takes action in response to an event. It is to be understood that other servers associated with the online content management service (e.g., a user account server or a content management server) can also send event information 222 to notification server 202 based on activity occurring at those servers. Examples of events and associated information are described below with reference to FIG. 4.

Notification server 202 can generate a notification record 226 based on event information 222 and store notification record 226 in notifications data store 210, which can be implemented, e.g., using a database or any other data storage technology and a suitable computer-readable storage medium. Notification record 226 can include a row in a database table, or any structured data object, that represents event information 222 in a manner that makes a particular notification readily retrievable by notification server 202 in response to a request from a client. An example structure for notification record 226 is described below with reference to FIG. 5.

Notification server 202 can also promulgate notification messages to clients and/or users via various channels to inform the clients and/or users of the event. In some embodiments, notification server 202 generates a message 228 corresponding to notification record 226 and adds message 228 to message queue 212. Message 228 can, but need not, contain the actual information in notification record 226; in some embodiments, message 228 can simply indicate the existence of a notification record 226 and provide information usable to route message 228 to a client and to allow a receiving client to retrieve notification record 226 from data store 210. For example, message 228 can include an identifier of the user for whom the message is intended and an identifier of record 226.

Delivery of a promulgated message 228 to a client can be accomplished in a client-specific manner using push-notification dispatcher 204. Push-notification dispatch server 204 (also referred to as a push-notification dispatcher) can read messages from message queue 212 and can generate appropriate client-specific notification messages; the notification messages can be sent via a channel (e.g., a notification service) appropriate to a specific client. For instance, in some embodiments, push-notification dispatcher 204 can leverage a push-notification service associated with a particular client device's operating system (e.g., Apple Push Notification Service, operated by Apple Inc., which supports third-party push notifications to devices running Apple's iOS operating system; Google Cloud Messaging, operated by Google, Inc., which supports third-party push notifications to devices running the Android operating system). In some embodiments, a push-notification service can be provided to a web client, e.g., using long pulling or other techniques. Examples of a push-notification dispatcher that supports clients across multiple platforms are described in U.S. patent application Ser. No. 13/741,210. Any combination of clients can be supported by providing a push-notification dispatcher capable of correctly formatting and routing notification messages to each client.

In some embodiments, push notification dispatcher 204 can be configured to support real-time notification, meaning that dispatcher 204 sends notification messages without intentionally introduced delay. It is to be understood that server loads, network traffic, and the like may cause delay between when a notification message is queued in message queue 212 and when the message reaches the client device; however such unintentional delay is considered as a "real-time" notification.

In some embodiments, message queue 212 can be periodically purged of old messages (e.g., messages can expire after some fixed time period such as a day or a week) and/or messages that are known to have been processed by push-notification dispatcher 204.

In response to receiving a client-specific notification message, the receiving client can request the corresponding notification record 226 from notification data store 210, e.g., by sending a request to notification server 202 or another server (not shown), using information contained in the received client-specific message to identify the record of interest.

Notification server 202 can also promulgate notification messages to users via other channels such as email (or other client-independent channels). For example, notification server 202 can generate an email record 230 that incorporates information from notification record 226 and can add email record 230 to email queue 214. Email record 230 can include a complete email message 232 (e.g., including a message body and header fields identifying sender, recipient, time, subject, and other information as desired) and can also include metadata 234 descriptive of the email message and/or the underlying event 222 or event record 226. Specific examples of metadata 234 are described below.

Email server 206 can read email records 230 from email queue 214 and can determine whether to send email 232, with the determination being based at least in part on metadata 234. For example, as described below, email server 206 can use metadata 234 to determine whether the target user has already acted on the event underlying the notification. If the user has already acted, email server 206 can prevent email 232 from being sent (e.g., by deleting email record 230 from queue 214 without having sent email 232). In some embodiments, email server 206 can incorporate delaying logic, e.g., to allow time for the user to respond to a notification sent by push-notify dispatcher 204, prior to determining whether to send email 232. An email sent from email server 206 can be delivered to a user's email inbox 238 via a network 240 (e.g., the Internet).

Figure 3:
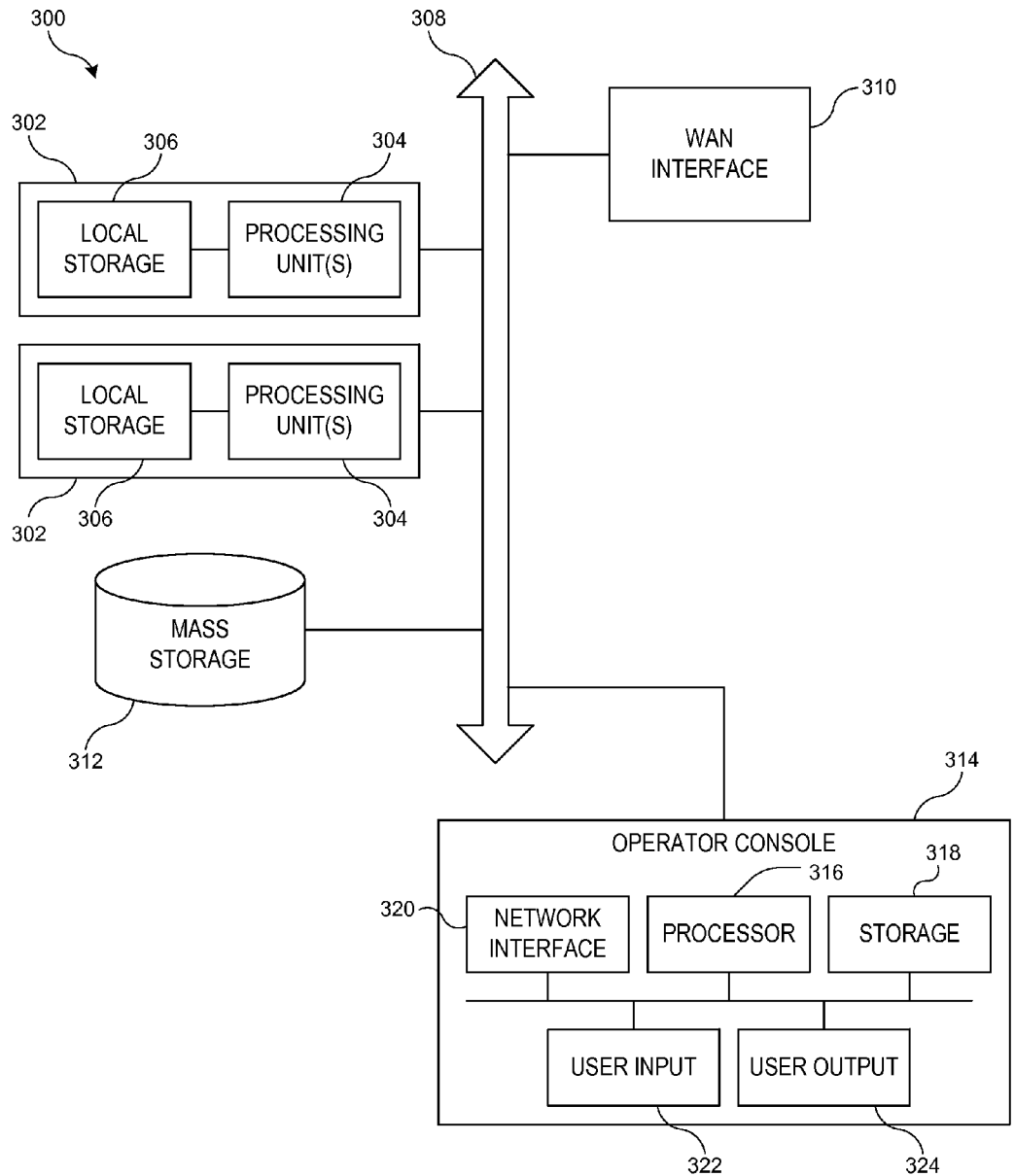
FIG. 3 shows a simplified block diagram illustrating a representative server system.

Various operations described herein can be implemented on server systems, which can be of generally conventional design. FIG. 3 is a simplified block diagram illustrating a representative server system 300. In various embodiments, server system 300 or similar systems can implement notification server 202, email server 206, application server 220, or any other servers described herein or portions thereof.

Server 300 can have a modular design that incorporates a number of modules 302 (e.g., blades in a blade server implementation); while two modules 302 are shown, any number can be provided. Each module 302 can include processing unit(s) 304 and local storage 306.

Processing unit(s) 304 can include a single processor, which can have one or more cores, or multiple processors. In some embodiments, processing unit(s) 304 can include a general-purpose primary processor as well as one or more special-purpose co-processors such as graphics processors, digital signal processors, or the like. In some embodiments, some or all processing units 304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 304 can execute instructions stored in local storage 306. Any type of processors in any combination can be included in processing unit(s) 304.

Local storage 306 can include volatile storage media (e.g., conventional DRAM, SRAM, SDRAM, or the like) and/or non-volatile storage media (e.g., magnetic or optical disk, flash memory, or the like). Storage media incorporated in local storage 306 can be fixed, removable or upgradeable as desired. Local storage 306 can be physically or logically divided into various subunits such as a system memory, a read-only memory (ROM), and a permanent storage device. The system memory can be a read-and-write memory device or a volatile read-and-write memory, such as dynamic random access memory. The system memory can store some or all of the instructions and data that processing unit(s) 304 need at runtime. The ROM can store static data and instructions that are needed by processing unit(s) 306. The permanent storage device can be a read-and-write memory device. This permanent storage device can be a non-volatile memory unit that stores instructions and data even when module 302 is powered down. The term "storage media" as used herein includes any medium in which data can be stored indefinitely (subject to overwriting, electrical disturbance, power loss, or the like) and does not include carrier waves and transitory electronic signals passing wirelessly or over wired connections.

In some embodiments, local storage 306 can store one or more software programs to be executed by processing unit(s) 304, such as an operating system and/or programs implementing various server functions such as functions of notification server 202, push-notify dispatcher 204, email server 206, app server 220, or any other server(s) associated with online content management system 100 of FIG. 1. "Software" refers generally to sequences of instructions that, when executed by processing unit(s) 304 cause server system 300 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 304. Software can be implemented as a single program or a collection of separate programs or program modules that interact as desired. From local storage 306 (or non-local storage described below), processing unit(s) 304 can retrieve program instructions to execute and data to process in order to execute various operations described herein.

In some server systems 300, multiple modules 302 can be interconnected via a bus 308, forming a local area network that supports communication between modules 302 and other components of server system 300. Bus 308 can be implemented using various technologies including server racks, hubs, routers, etc.

A wide area network (WAN) interface 310 can provide data communication capability between the local area network (bus 308) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 306 is intended to provide working memory for processing unit(s) 304, providing fast access to programs and/or data to be processed while reducing traffic on bus 308. Storage for larger quantities of data can be provided on the local area network by one or more mass storage subsystems 312 that can be connected to bus 308. Mass storage subsystem 312 can be based on magnetic, optical, semiconductor, or other data storage technologies. Direct attached storage, storage area networks, network-attached storage, and the like can be used. Any data stores or other collections of data described herein as being produced or consumed by servers can be stored in mass storage subsystem 312. In some embodiments, additional data storage resources may be accessible via WAN interface 310 (potentially with somewhat increased latency).

Server system 300 can operate in response to requests received via WAN interface 310. For example, one of modules 302 can implement a supervisory function and assign discrete tasks to other modules 302 in response to received requests. Conventional work allocation techniques can be used. As requests are processed, results can be returned to the requester via WAN interface 310. Such operation can generally be automated. Further, in some embodiments, WAN interface 310 can connect multiple server systems 300 to each other, providing scalable solutions capable of managing high volumes of activity. Conventional or other techniques for managing server systems and server farms (collections of server systems that cooperate) can be used, including dynamic resource allocation and reallocation.

In some embodiments, operator console 314 can be provided to allow a system operator or administrator to interact directly with server system 300, e.g., for purposes of monitoring, testing, troubleshooting, upgrading, or the like. Operator console 314 can include conventional computer components such as a processor 316, storage device 318, network interface 320, user input device 322, and user output device 324. In some embodiments, operator console 314 can be physically remote from the rest of server system 300 and can be connected via WAN interface 310.

Processor 316 and storage device 318 can be similar to processing unit(s) 304 and local storage 306 described above. Suitable devices can be selected based on the demands to be placed on operator console 314; for example, console 314 can be implemented as a "thin" client with limited processing capability. Network interface 320 can provide a connection to bus 308. User input device 322 can include any device (or devices) via which a user can provide signals to console 314; console 314 can interpret the signals as indicative of particular user requests or information. In various embodiments, user input device 322 can include any or all of a keyboard, touch pad, touch screen, mouse or other pointing device, scroll wheel, click wheel, dial, button, switch, keypad, microphone, and so on.

User output device 324 can include any device via which console 314 can provide information to a user. For example, user output device 324 can include a display to display images generated by or delivered to console 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 324 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 304 can provide various functionality for server system 300, including any of the functionality described herein as being performed by a server or other functionality associated with an online content management service.

As noted above, an online content management service can interact with various user-owned or user-operated devices via a network such as the Internet. The user-operated devices can be computer systems, e.g., with components similar to operator console 314, with network connectivity provided using wired and/or wireless technologies. Such devices can be provisioned with program code to enable various interactions with the online content management service such as accessing stored content items, receiving push notifications, retrieving and displaying interface screens (e.g., web pages), and so on. Some user devices can also interact with an email service (which can be independent of the online content management service), e.g., via a network interface.

It will be appreciated that server system 300 is illustrative and that variations and modifications are possible. Server system 300 can have other capabilities not specifically described here. Further, while server system 300 is described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As described above with reference to FIG. 2, system 200 can operate to notify users of various events, where an event can include any of a number of possible occurrences. For example, users can be notified of invitations from other users to share access to a content item such as a shared folder within which all sharing users can create or edit content items. Users also can be notified of invitations to view content items using a shareable link. In some embodiments, the shareable link can include a uniform resource locator (URL) (or other unique identifier) for a content item managed by online content management service 100. The URL can be created by online content management service 100 in response to a request from the user who owns the content item and can be provided to that user, who can then distribute the shareable link to others, e.g., by using a sharing interface provided by online content management service 100 or by sending an email message, social-network message, or other communication that includes the shareable link. Other occurrences that may generate notifications can include when an invited user accepts or declines an invitation to share a folder, when an invited user accesses a content item using a shared link, and account-related events such as security events, payment-related events, and so on.

Figure 4:
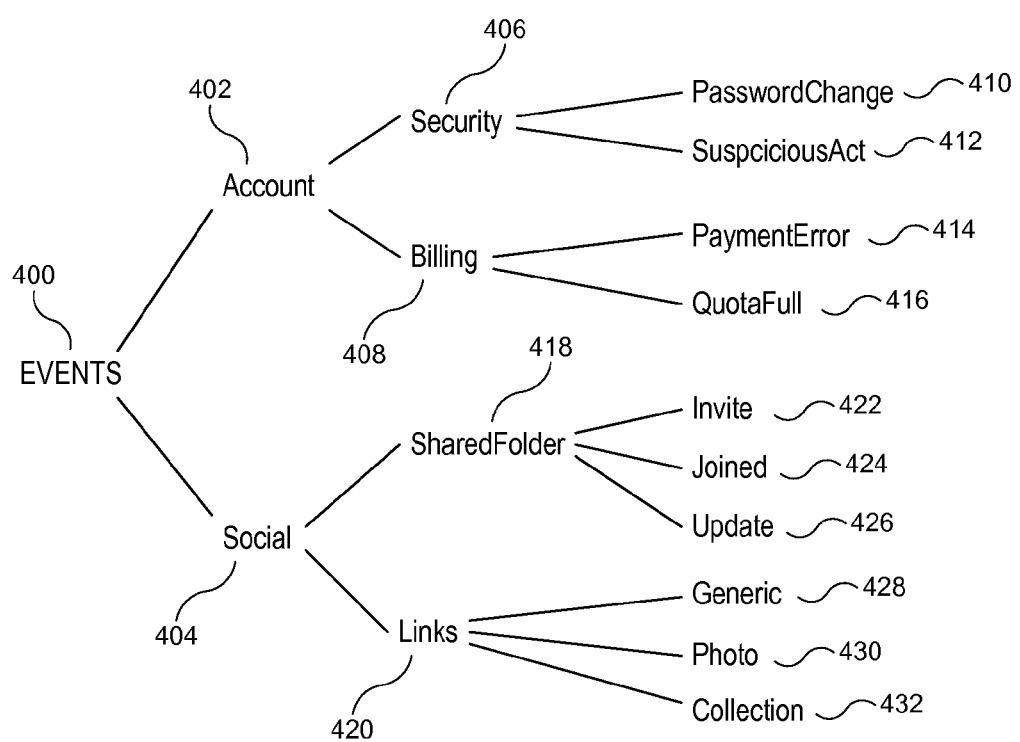
FIG. 4 shows an event taxonomy according to an embodiment of the present invention.

To further illustrate a variety of events, FIG. 4 shows an event taxonomy according to an embodiment of the present invention. In this example, events (node 400) can be classified at a first level based on whether they relate to an account (node 402) or social activity (node 404). Account-related events at node 402 can be further classified at a second level based on whether they relate to security (node 406) or billing (node 408). Security events at node 406 can be further classified into specific events such as password changes (leaf node 410) and suspicious activity suggesting a user's account may be compromised or under attack (leaf node 412). Similarly, billing events at node 408 can be further classified into specific events such as payment errors (leaf node 414) and quota full (leaf node 416).

Similarly, social-activity events at node 404 can be further classified at a second level based on whether they relate to shared folders (node 418) or link sharing (node 420). Shared-folder events at node 418 can be further classified into specific events such as an invitation (leaf node 422), joining (leaf node 424), and updating (leaf node 426). Link-sharing events at node 420 can be further classified into specific events such as sharing a generic file link (leaf node 428), sharing a photo link (leaf node 430), and sharing a collection (such as a link to a folder) (leaf node 432).

In some embodiments, each event can be assigned a hierarchically structured event identifier representing its location in the taxonomy; for example, a quota-full event can have an event identifier 402-408-416. Other rules for assigning event identifiers can also be used.

It will be appreciated that the event taxonomy and specific events shown in FIG. 4 are illustrative and that variations and modifications are possible. An event taxonomy can include any number of levels (including the degenerate case of a single level), and any number of nodes can be present at each level. In some embodiments, an event taxonomy can be used to filter notifications, e.g., for purposes of determining what notifications to send, what channels to use, when to send notifications, and so on.

As described above, notification server 202 can generate and store notification records 226. FIG. 5 shows examples of notification records 226 according to an embodiment of the present invention. In this example, each notification record 226 has a structure shown at column 502. Columns 504, 506, 508 provide examples of notification records having this structure.

In this example, notification records are structured to facilitate sorting and/or filtering by topic and time. For instance, topic fields 510 can include one or more fields that, taken together, provide information indicating the subject matter of the notification record. In this example, topic fields 510 include an event type identifier, which can be a node identifier from the hierarchy of FIG. 4; a target object, which can be an identifier of a file or folder to which the event pertains; and a target user identifier, which can identify the user who is to receive the notification. In each of columns 504, 506, 508, the topic fields indicate that the notification pertains to the same topic: a shared folder invitation for a folder called "VacationPhotos" to user Bob.

Sequence fields 512 provide information usable to sort notification records into a logical sequence. In some embodiments, the sorting can be based on time, and sequence fields 512 can provide time-based information usable to sort notification records into a temporal sequence. For example, for purposes of identifying specific records, notification server 202 can assign a serial number to each notification record as it is generated; in some embodiments, serial numbers can be generated in a monotonically increasing sequence. In some embodiments, the serial number can be unique across all messages in notifications data store 210, and a particular notification record can be located by reference to its serial number. In other embodiments, the serial number can be unique across all messages having the same target user, and a particular notification record can be located by reference to the target user ID and serial number.

Sequence fields 512 can also include one or more time stamps. In this example, a send time is included. The send time can reflect the time when server 202 generated the notification record and/or when server 202 generated the corresponding message 228 and/or email record 232 for message queue 212 and/or email queue 214. In this example, a "feed time" is also included. The feed time can reflect a time reference established by the source of the underlying event (e.g., a particular client or server). For example, if a client takes action responsive to a first event, the second notification record can have a feed time that matches the feed time of the first notification record. In some embodiments, clients or other sources that report events are permitted to specify a feed time to be associated with the corresponding notification record, and server 202 can impose limits on allowable feed times, such as a rule specifying that the feed time can be no later than the send time (which is determined by server 202).

Other time fields (not shown) can also be included. For example, an event time field can be used to indicate when the event that led to creation of the notification record occurred.

Content fields 514 can provide further details related to the event. For example, content fields 514 can include a payload field, an originating user field, an originating application field, and a status field. The payload field can include event-specific data. In some embodiments, the payload field can be formatted as a key/value dictionary, with particular combinations of keys and values being prescribed for particular events. For example, if a user accepts or declines an invitation, the payload can include a key-value pair indicating whether the invitation was accepted or declined. The originating user field can identify a user who took the action that resulted in the event, e.g., in the case of an invitation, the originating user can be the user who issued the invitation. The originating app can identify the particular application or platform from which the action was taken.

The status field can indicate a status associated with the notification. In some embodiments, the status field can be an enumerated type corresponding to different states of the notification record. For instance, the enumerated values can include {unread, read, invisible}. In this example, "unread" indicates that the user is (probably) not yet aware of the event (or the notification); "read" indicates that the user is aware of the underlying event (or the notification); and "invisible" indicates that some action has occurred making the underlying event (or the notification) obsolete. In some embodiments, when a notification is acted on by a client, a new event is generated with an updated status field (and possibly other updated content fields). The new event can result in a new notification record being generated, rather than modifying or overwriting a previous notification record. The status field can be used in processing multiple notifications associated with the same topic; for instance, if a client receives a first notification indicating a shared folder invitation that is unread, then receives a second notification indicating that the shared folder invitation is now invisible, the client can update a notification feed accordingly (e.g., by hiding the invitation after being notified that it has been acted upon).

Referring again to FIG. 2, when a notification record 226 is created, server 202 can add a corresponding message 228 to message queue 212 and/or a corresponding email record 230 to email queue 214. Message 228 and/or email record 230 can, but need not, include the same information as notification record 226. In some embodiments, message 228 and/or email record 230 can instead provide information that is usable by a client to retrieve the corresponding notification record 226. Examples of messages 228 are described in above-referenced U.S. patent application Ser. No. 13/741, 210.

FIG. 6 shows examples of email records 230 according to an embodiment of the present invention. In this example, each email record has a structure shown at column 602. Columns 604, 606, 608 provide examples of email records having this structure.

Content fields 610 can include a payload that contains the actual email message to be sent. In some embodiments, the email message is ready to send as-is; for instance, it can include the appropriate header fields (From, To, Reply-To, Send Date, Subject, etc.) and a message body that conveys the substance of the notification. The message body can be formatted as desired (plain text, HTML, or other formats) and can include active elements such as clickable links or other user-operable controls to communicate a response to the notification to online content management service 100. For instance, in the case of a shared folder invitation, the message body can state the invitation (e.g., "Joe has invited you to share the folder Folder3") and prompt the user to respond (e.g., "Click here to accept/Click here to decline").

Metadata fields 612 can include any type of information that can facilitate processing of an email record by email server 206. In this example, metadata fields 510 include an event type identifier, which can be a node identifier from the hierarchy of FIG. 4; an event ID, which can be a unique identifier associated with the event or the notification record (similar or identical to the serial number of FIG. 5); a target user identifier that identifies the user to whom the email is to be sent; an originating user identifier that identifies the user whose action originated the event; and a timestamp that can indicate when the event occurred, when the notification record was created, and/or when the email record was added to email queue 214. Any or all of the fields shown in FIG. 5 can also be included in metadata fields 612.

By way of illustration, columns 604, 606, 608 provide examples of email records for specific events. Email record 604 can correspond to notification record 504 of FIG. 5. In this example, the event ID corresponds to the serial number of the notification record, although this is not required. Email record 606 can correspond to an event in which user Bob has created a shareable link to be sent to user Kay. Email record 608 can correspond to an event in which the online content management service (identified as user "System") has determined that user Bob has exceeded his storage quota.

Using data structures such as those of FIGS. 5 and 6, system 200 of FIG. 2 can coordinate notifications across various notification channels associated with a particular user, such as push notifications to the user's clients, email notifications to the user's email address, instant-message notifications, or the like. Examples of processes that can be implemented in system 200 to provide a coordinated multichannel notification service will now be described.

One coordination strategy includes sending a first notification (via a first channel) and delaying sending of a second notification (via a second channel different from the first channel) for a period of time sufficient to allow the user to act on the first notification. If the user acts on the first notification (or the underlying event) within that time period, sending of the second notification can be cancelled. For example, some embodiments of the present invention can send a push notification to one or more of the user's clients, then wait for a period of time (e.g., 5 minutes, 30 minutes, 1 hour, or any other period); if the user does not respond, an email notification can be sent.

Figure 7:
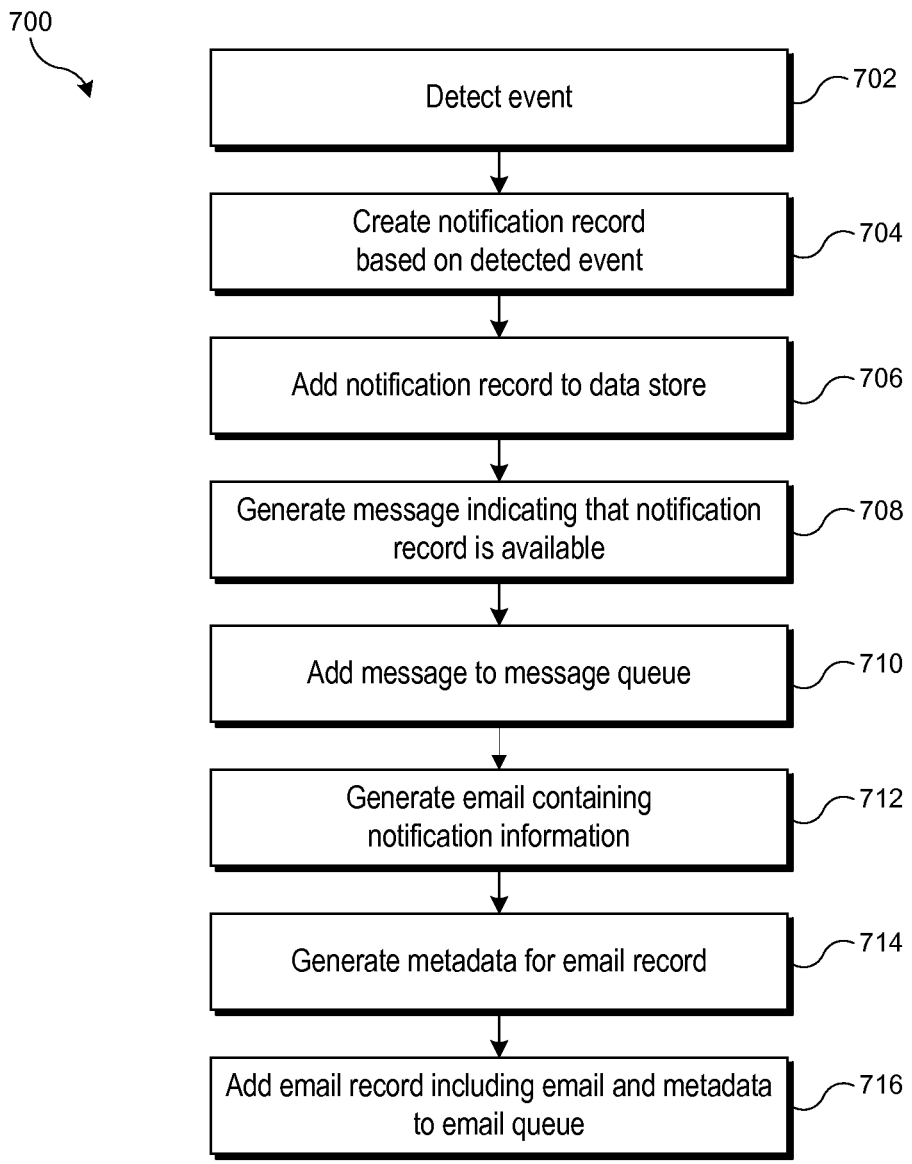
FIG. 7 shows a flow diagram of a process for queuing event notification messages according to an embodiment of the present invention.

FIG. 7 is a flow diagram of a process 700 for queuing notifications to be sent to a user according to an embodiment of the present invention. Process 700 can be implemented on a server, e.g., notification server 202.

At block 702, notification server 202 can detect an event. For example, server 202 can receive event information 222 from another server or from a client. At block 704, notification server 202 can generate a notification record 226 based on the detected event; data structure 500 of FIG. 5 or another data structure can be used. In some embodiments, notification server 202 can apply decision rules to determine whether a notification record should be generated in response to a particular event. For example, users may be able to opt out of receiving all notifications or certain types of notifications, and notification server 202 can determine whether the user has opted out. User options can also be implemented at later stages of processing, e.g., as described below.

At block 706, notification server 202 can add notification record 226 to notifications data store 210. At block 708, notification server 202 can generate a message 228 indicating that notification record 226 is available. At block 710, notification server 202 can add message 228 to message queue 212. These blocks can be similar to processes described in U.S. patent application Ser. No. 13/741,210.

At block 712, notification server 202 can generate an email message 232 containing notification information. For example, notification server 202 can access listeners data store 216 to determine an email address for the target user and use this to populate the "To" header of the email message. The "From" header can be populated, e.g., with an email address associated with online content management service 100 or with the originating user. Notification server 202 can use a lookup table or other data structure to select a "Subject" header based on the event type; in some instances, the lookup table can provide a parameterized subject header (e.g., "Shared folder invitation from <origin user>"), and notification server 202 can populate the parameters (e.g., <origin user>) based on event record 226. A message body can also be generated by using a table lookup or the like to identify a suitable parameterized message body template based on event type; the template can be customized based on event record 226. Other techniques can be used.

At block 714, notification server 202 can generate metadata 234 to complete email record 230. Metadata fields can be predefined (e.g., according to the structure of FIG. 6 described above), and notification server 202 can populate the fields with information based on event record 226. At block 714, notification server 202 can add email record 230 to email queue 214.

Process 700 can be repeated for each event that notification server 202 detects. Accordingly, each event can result in a separate notification record being added to notifications data store 210. In some embodiments, notification records are not deleted from notifications data store 210. In other embodiments, notification records can be deleted, e.g., via a periodic purge of stale notifications as determined based on send time. For example, notifications can be kept for a fixed period of time, e.g., a day or a week or a month, after which they are presumed to be no longer of interest and deleted. More complex rules for purging notifications data store 210 can be used, such as rules based on event type or notification topic. For example, notifications related to payment errors may be preserved until the error is resolved, while notifications about shared-folder invitations received or accepted may be deleted after some fixed period of time.

Figure 8:
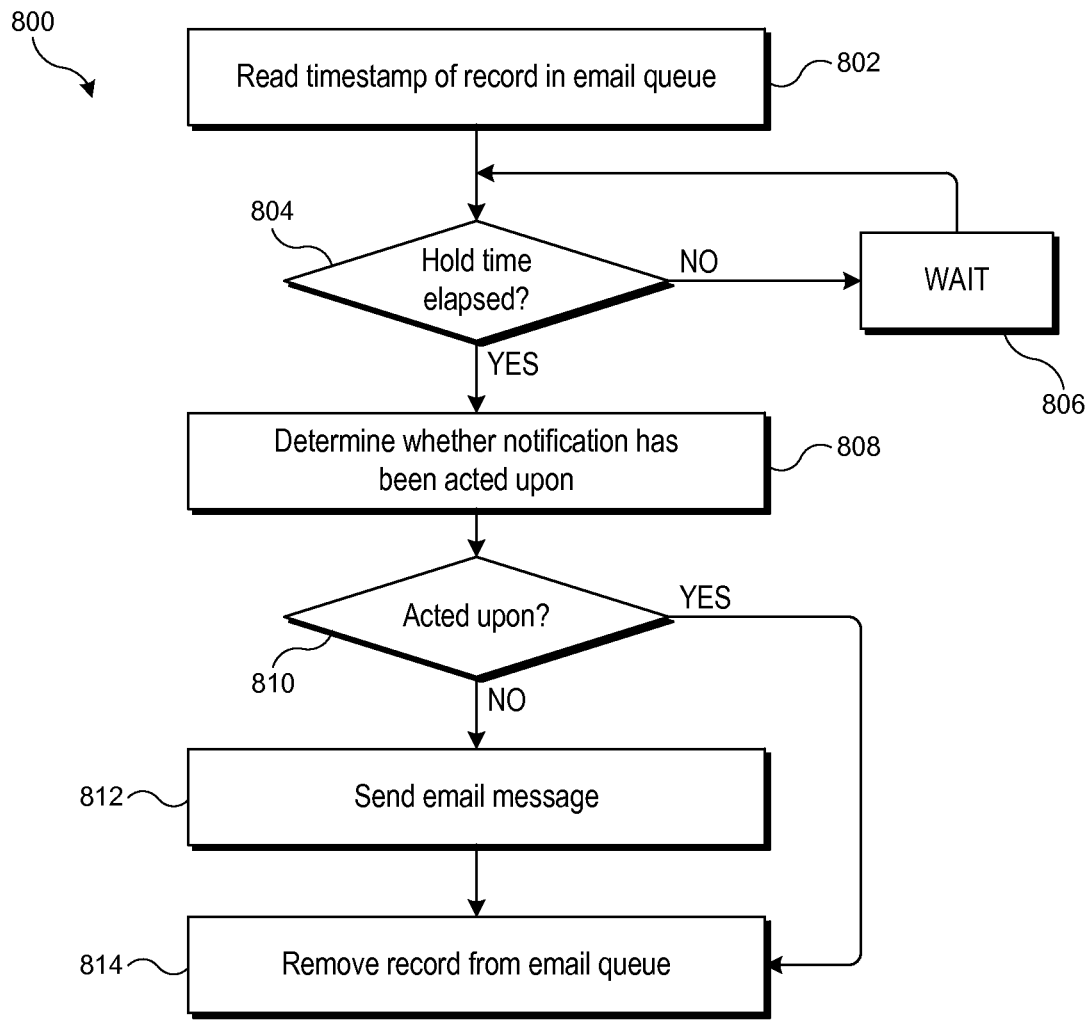
FIG. 8 shows a flow diagram of a process for sending an email notification to a user according to an embodiment of the present invention.

FIG. 8 is a flow diagram of a process 800 for sending an email notification according to an embodiment of the present invention. Process 800 can be implemented on a server, e.g., email server 206.

At block 802, email server 206 can read a timestamp of a record 230 in email queue 214. As noted above, a timestamp can be included in metadata 234 of each record 230, and block 802 can include reading this timestamp.

At block 804, email server 206 can determine, based on the timestamp, whether a hold time for record 230 has elapsed. The hold time can be a programmed value indicating a minimum time that email server 206 is to wait before sending email 232 after record 230 has been added to queue 214. The specific programmed value is a matter of design choice and can be chosen to be long enough that if the user has not acted on a first notification sent concurrently with adding record 230 to queue 214 (e.g., a push notification sent via push-notify dispatcher 204) by the time the hold time lapses, it is considered unlikely that the user will act on the first notification at a later time. For example, if the first notification is delivered to a feed that is updated in real-time or presented as a pop-up notification that has a finite lifespan as a visible object, it may become unlikely that a user will respond to the first notification if it is older than a few minutes. The hold time can be chosen accordingly, e.g., 5 minutes, 15 minutes, 30 minutes, an hour or the like.

If, at block 804, the hold time has not elapsed, process 800 can wait at block 806 until such time as the hold time has elapsed. If queue 214 is operated as a FIFO (first-in, first-out) and the timestamp of the oldest entry is read at block 802, it can be inferred that any other messages in the queue have more recent timestamps and are therefore not ready to send. Alternative embodiments can allow the hold time to be different for different messages (examples are described below), and in such cases, rather than waiting, process 802 can return to block 802 to read a timestamp of a different record 230, allowing a more recent record with a short hold time to bypass an older record in queue 214.

After the hold time has elapsed, at block 808, email server 206 can determine whether the notification corresponding to record 230 has been acted upon. For example, email server 206 can query app server 220 (or another server, not shown) using some or all of metadata 234 of record 230. App server 220 can determine, e.g., based on event log 224, whether an event corresponding to the target user acting on the notification has occurred. As another example, a response to one notification can generate another notification record (e.g., where a user accepts a shared folder invitation, as illustrated by events 504 and 508 of FIG. 5). Accordingly, in some embodiments, email server 206 can query notification server 202 (which can access notifications data store 210) to determine whether a notification record indicative of the target user acting on the notification has been generated.

What constitutes acting on a particular notification depends on the nature of the notification and/or the underlying event. For instance, if the event to which the notification pertains is a shared folder invitation sent to the target user, acting on the notification can include the target user accepting the invitation or declining the invitation. Either action involves interaction by the target user with online content management service 100; for instance, the user may interact with a client (e.g., any of clients 112, 114, 116 of FIG. 1) to indicate acceptance or declining, and the client may communicate with online content management service 100 to implement the indicated action. As another example, if the event to which the notification pertains is exceeding the user's quota of storage space, the user may respond by removing content items from online content management service 100 to reduce the usage below the quota or by contacting online content management service 100 to obtain a larger quota (e.g., by paying for upgraded service). More generally, any action by the user that results in interaction with the online content management service and that addresses the circumstance underlying the notification can constitute acting on the notification. Thus, "acting on" or "acting upon" a notification can include any user action that addresses the underlying event, regardless of whether the user actually received or was prompted to action by any notification.

A notification can be considered to have been "acted upon" regardless of whether the user interaction was in fact caused by user receipt of an earlier-sent notification. For instance, a user might periodically delete old or unneeded content items as part of routine cleanup, unprompted by a notification regarding a storage quota. If the user happens to do so after a push notification about exceeding the quota was sent and while an email notification about exceeding the quota happens to be waiting in email queue 214, this can still be considered as acting on the notification, regardless of whether the user even saw the push notification.

At block 810, if it is determined that the user has not acted upon the notification, then at block 812, email server 206 can send email message 232 to the user. Regardless of whether the user has acted upon the notification, at block 814, record 230 can be removed from email queue 214. Consequently, in instances where it is determined at block 812 that the user has acted upon the notification, the email message containing the notification is not sent to the user.

Process 800 can be repeated to allow email server 206 to process any number of email records. Records can be processed in the order received, or out-of-order as desired. It should be noted that process 800 provides that the email message will not be sent prior to expiration of the hold time and thus establishes a minimum delay on the email notification. In practice, the actual delay can be longer (e.g., if email server 206 is managing a large number of messages, or if outgoing email from email server 206 is suspended or delayed at any step of transmission).

Used together, processes 700 and 800 can provide coordinated notifications across multiple notification channels. Process 700 provides for queuing notifications in multiple independently processed queues, with different queues being associated with different notification channels. Process 800 provides for delaying the sending of a notification in one of the channels (in this case, email) for at least a specified hold time and cancelling the send operation if the user acts on another notification (or the underlying event) in the interim.

It will be appreciated that processes 700 and 800 are illustrative and that variations and modifications are possible. Steps described as sequential may be executed in parallel, order of steps may be varied, and steps may be modified, combined, added or omitted. For instance, a notification server can generate a push-notification message and an email record in parallel or in any order. Notifications can be queued in any number of separate queues corresponding to different notification channels, and sending of notifications from different queues can be delayed for different periods of time, e.g., by using process 800 or variations thereof on each delayed queue. (For instance, push-notify dispatcher 204 of FIG. 2 can implement a process similar to process 800 to delay sending of a push notification to one or more of a user's clients.) Consequently, a succession of notifications of a single underlying event can be sent to a user via different channels in an attempt to direct the user's attention to the underlying event; if one notification succeeds, sending of all subsequent notifications can be dynamically cancelled.

In some embodiments, process 800 can be implemented selectively based on event type. For instance, for certain types of notifications (e.g., a notification of a shareable link that contains the link), a target user may want to save the notification for later reference. Email, with its storage and organizational capabilities, may be preferred for this purpose over a push notification that is more likely to be available for a relatively short time and difficult or impossible to locate later. Such instances can be accommodated through suitable modifications of process 800. For example, as noted above, an event type can be included in metadata 234 of email record 230, and for certain event types process 800 can send the email message regardless of whether the user has acted on any other notification.

Further, the hold time can be determined based on the event type; for instance, event types for which it is desired to unconditionally send an email notification can have a hold time of zero. Email server 206 (or another server) can maintain a data structure that maps event types to hold times. In some embodiments, the hold time can be specified on a per-notification basis, e.g., by including a hold time in metadata 234. As noted above, entries in email queue 214 need not be processed in order; accordingly, if the hold time for the oldest record in queue 214 has not elapsed, process 800 can check the hold time of another record.

Additional customization is also possible, e.g., based on preferences established by a particular originating or target user. For instance, some users may want to receive all notifications via email while other users may want to receive no notifications via email. In some embodiments, users of an online content management service can access an account settings menu using various clients (e.g., any of clients 112, 114, 116) to specify preferences as to which events should generate notifications and what type of notifications should be sent (e.g., email, push notification, text message, etc.).

Figure 9:
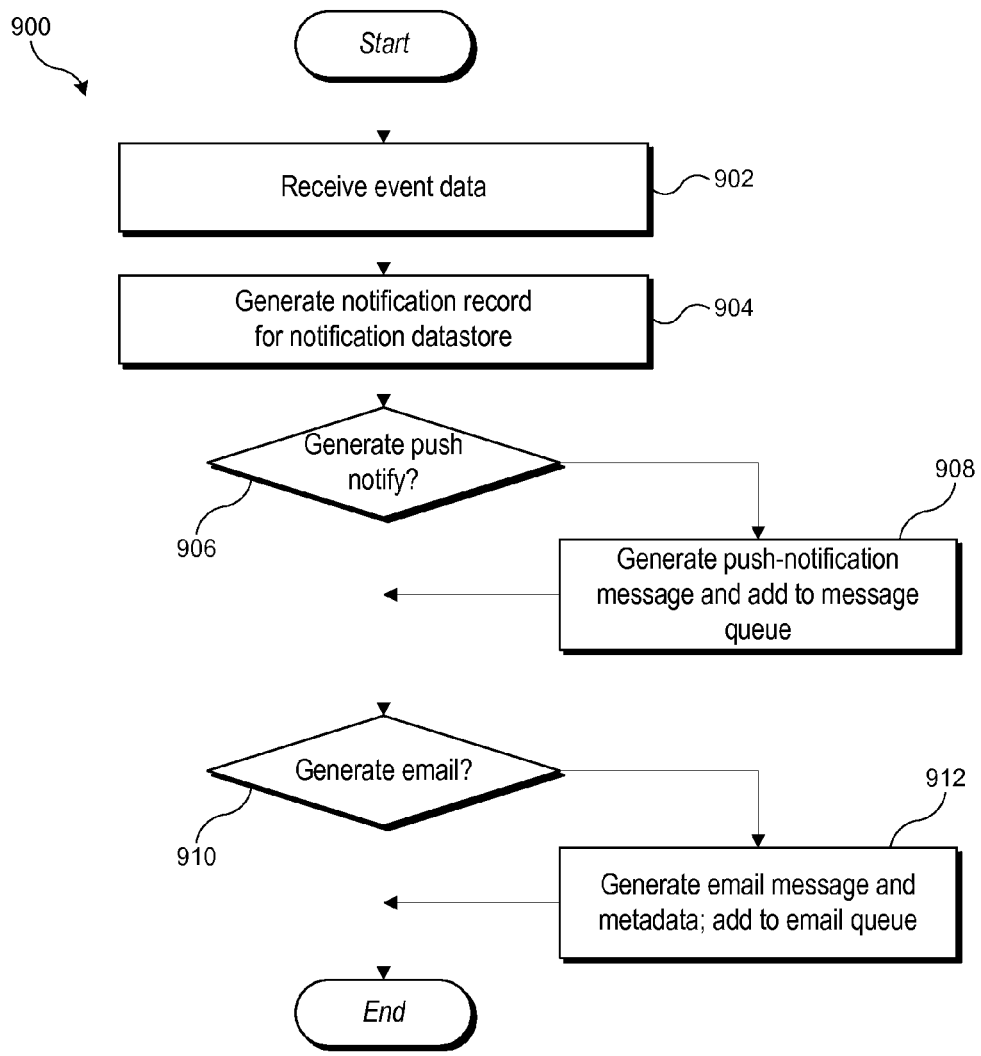
FIG. 9 shows a flow diagram of a process for selectively queuing event notification messages according to an embodiment of the present invention.

FIG. 9 is a flow diagram of a process 900 for selectively generating notification messages according to an embodiment of the present invention. Process 900 can be implemented, e.g., in notification server 202 of FIG. 2.

Process 900 can begin when notification server 202 receives event data at block 902. At block 904, notification server 202 can generate notification record 226 for notification data store 210. These blocks can be similar or identical to blocks 702-706 of process 700 described above.

At block 906, process 900 can determine whether to generate a push notify message for the event. The determination can be based on a set of decision rules defined with reference to characteristics of the event, of the originating user (which in some instances can be the online content management service itself), and/or of the target user (to whom the notification is directed).

Certain decision rules can be based on event type and considerations regarding likely user preferences. For instance, depending on the implementation of a particular client or client device, a push notification can result in an alert (e.g., an on-screen pop-up, sound effect, or the like).

Some types of events, such as posting of a payment, may not warrant interrupting the user with a real-time alert, and push notifications can be selectively omitted for events of this type by implementing a decision rule based on event type.

Other decision rules can be based on expressed user preferences (e.g., using an account settings menu as described above). For instance, a user may be able to specify a preference to receive push notifications regarding shared folder invitations but not shareable links, or to receive no push notifications at all, or to receive push notifications only on specific clients. In some embodiments, the originating user can also specify preferences for notifications on a per-event basis; for instance, a user who originates a shared folder invitation may be able to specify whether the invited users should receive an email, a push notification, or both. Any combination of decision rules and priority among the rules can be defined.

If, at block 906, it is determined that a push notification should be generated, then at block 908, notification server 202 can generate a push-notification message 228 and add it to message queue 212, similarly to blocks 708 and 710 of process 700 described above.

Regardless of whether a push-notification message is generated, at block 910, process 900 can determine whether to generate a notification email for the event. As with the determination at block 906, the determination at block 910 can be based on a set of decision rules defined with reference to characteristics of the event, of the originating user (which in some instances can be the system), and/or of the target user (to whom the notification is directed). In some embodiments, the determination at block 910 can also be based on whether a push-notification message was generated at block 906; for instance, one decision rule can specify that if a push-notification message was not generated, then an a notification email is always generated. In some embodiments, this rule can have priority over all other rules; in other embodiments, this rule can be overridden by other rules (e.g., the target user's preference not to receive certain emails).

If, at block 910, it is determined that a notification email should be generated, then at block 908, notification server 202 can generate an email record 230 and add it to email queue 214, similarly to blocks 712, 714, and 716 of process 700 described above.

Process 900 can be repeated for each event. Like process 700, process 900 can be used with process 800 to coordinate notifications across multiple channels, allowing for a more customized user experience. In this connection, it should be noted that process 800 does not require that any other notification was actually generated or sent. In some embodiments, notification server 202 can provide an indication in email record 230 as to whether any other notification (e.g., push notification) was generated, e.g., as part of metadata 234, and email server 206 can use this information to determine whether and/or when to send email 232. For instance, email server 206 can apply a hold time of zero if no other notification was generated.

In process 900, notification server 202 makes an initial ("event-time") decision whether to generate an email message and/or a push-notification message. Process 800 allows sending of the email message to be intentionally delayed and can cancel sending of the email if a user addresses the underlying event (e.g., by acting on a notification) in the interim.

Figure 10:
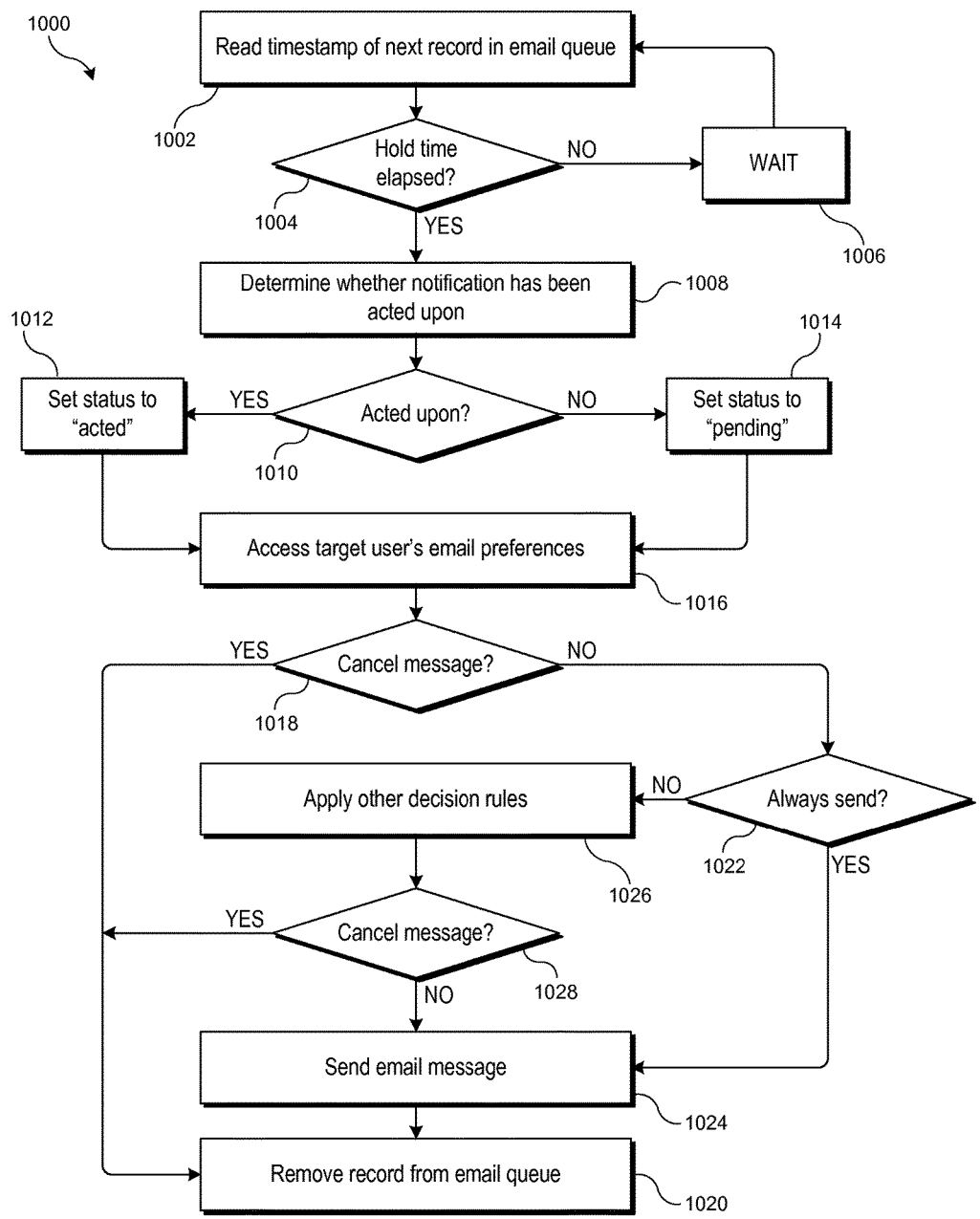
FIG. 10 shows a flow diagram of a process for sending an email notification to a user according to an embodiment of the present invention.

In some embodiments, process 800 can be modified to provide more customized control over sending of emails. FIG. 10 is a flow diagram of a process 1000 for sending an email notification according to an embodiment of the present invention. Process 1000 can be implemented on a server, e.g., email server 206.

At block 1002, email server 206 can read a timestamp of a record 230 in email queue 214. At block 1004, email server 206 can determine, based on the timestamp, whether a hold time for record 230 has elapsed. If the hold time has not elapsed, process 1000 can wait at block 1006 until such time as the hold time has elapsed. After the hold time has elapsed, at block 1008, email server 206 can determine whether the notification corresponding to record 230 has been acted upon. These blocks can be similar or identical to blocks 802-808 of process 800 described above.

At block 1010, if the notification has been acted upon, then at block 1012, process 1000 can set a notification status (which can be an internal state indicator) to "acted"; if not, then, at block 1014, process 1000 can set the notification status to "pending." Setting the notification status allows information about whether the notification has been acted upon to be used together with other information in determining whether to send the notification email.

For instance, at block 1016, email server 206 can access the target user's email preferences, e.g., based on the target user identifier included in metadata 234. In this example, the target user can indicate that, for a given event type, a notification email should always be sent, never be sent, or sent only if the notification has not already been acted on. Decision rules can be implemented, e.g., similarly to process 900 described above; in this case, however, a decision can be made closer in time to when the email is actually to be sent or cancelled.

Accordingly, at block 1018, it can be determined whether the notification email should be cancelled, e.g., based on the target user's preferences and the notification status (set at block 1012 or 1014). If so, then at block 1020, record 232 can be removed from email queue 214 without sending the email, thereby cancelling the email.

If, at block 1018, it is not determined that the notification email should be cancelled, then at block 1022 process 1000 can determine whether the notification email should always be sent, e.g., based on the target user's preferences and the notification status. If so, then at block 1024, email 230 can be sent. This decision logic can allow the target user's preferences to override any contrary preferences established by the originating user.

If, at block 1022, the conditions for always sending a notification email do not obtain, then at block 1026, other decision rules can be applied. For example, as noted above, an originating user can specify notification preferences, and these preferences can be indicated in metadata 234. Accordingly, at block 1026, a decision can be made based on these preferences. Decision rules can be implemented, e.g., similarly to process 900 described above; in this case, however, a decision can be made closer in time to when the email is actually to be sent or cancelled. At block 1028, if the decision results in a determination to cancel the email, process 1000 can proceed to remove the record from the queue at block 1020; otherwise, process 1000 can proceed to send the email at block 1024.

In this example, the target user's preferences can override any other decision rules. Some embodiments can implement more complicated decision logic, for example, determining that certain notification emails are to be sent regardless of any user preferences (e.g., emails pertaining to payment errors, security issues, or other "critical" events where the need of the online content management service to inform the user trumps any desire not to know that the user may have expressed).

It will be appreciated that processes 900 and 1000 are illustrative and that variations and modifications are possible. Either of processes 700 or 900 (or variations thereof) can be used with either of processes 800 or 1000 (or variations thereof) to implement a coordinated notification system across multiple channels.

In some embodiments, a hold time can be specified as a preference of the target user. Where this is the case, the hold time can be determined by notification server 202 and included in metadata 234, or the hold time can be determined by email server 206, e.g., by using the target user identifier in metadata 234 to look up the corresponding hold time.

Systems and processes as described herein and/or modifications thereof can be used in various combinations to provide coordinated event-based notifications to a user across multiple channels. Notifications can be delivered using any combination of channels including but not limited to email and push notifications (the examples used above). Examples of other channels that can be used to provide notifications to a user include social-media services that allow a user to receive messages, text messages sent to a user's mobile phone, instant messages using an instant-messaging service that might or might not be affiliated with the provider of the online content management service, and so on. As noted above, some channels (such as push notifications) can be client-specific, while other channels (such as email or instant messages) can be client-independent.

Where multiple notification channels are available, notifications can be selectively routed to different channels, e.g., by providing a separate message queue for each channel and using processes similar to process 900 to selectively add notification messages to appropriate queues. The selection of channel(s) for a particular notification can be based on the type of event underlying the notification, user preferences related to delivery of notifications, and the like. Further, the sending of notifications in different channels can be managed so that notifications in different channels are sent at different times (e.g., using processes similar to process 800 or process 1000), and sending of any given notification can be made to depend on whether the notification (or the underlying event) has already been acted on, as well as on user preferences related to delivery of notifications. Some notifications can be sent without delay and/or unconditionally.

Selection of notification channels, corresponding delay times, and conditions for sending notifications can be based at least in part on expectations regarding the manner in which users interact with particular notification channels. For instance, as noted above, a push notification may interrupt the user's work (which may or may not be desirable, depending on the importance or urgency of the underlying event), while an email can more easily be ignored until the user chooses to read it. As another example, push notifications may remain available only a short-term basis (e.g., for a few minutes or hours or until the user acknowledges them, depending on the particular client's implementation) and might not be archived or stored; short-term availability may be desirable in some contexts but not in others. Thus, it may be desirable to use push notifications to provide immediate alerts to the user, with email notifications providing information that the user can retain and act on when convenient.

While the invention has been described with respect to specific embodiments, one skilled in the art will recognize that numerous modifications are possible. For example, the particular events, data structures, servers, clients, and notification channels described herein are used for purposes of illustration; other events, data structures, servers, clients, and notification channels can be substituted.

It is not required that every notification result in an alert on all clients or even any clients. Where a notification does result in an alert, the alert can be presented to a user in any manner desired; an alert can incorporate visual elements (text, icons or images, colors, etc.), audible elements (tones, spoken words, etc.), tactile elements (vibrating or pulsing, etc.), and/or any other perceptible element or elements.

Embodiments described above may make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of providing a notification of an event, the method comprising:
   determining, by a server system, that a first notification has not been acted upon during an allotted amount of time, the first notification sent via a first notification channel, the determining performed by:
   identifying that a user account associated with the first notification has not responded to or interacted with the notification,
   identifying that the user account associated with the first notification has not accessed a content item identified by the notification, or identifying that the user account associated with the first notification has not performed an action that addresses an underlying event that triggered the first notification;
selecting a second notification channel that is different from the first notification channel;
sending, in response to the determining that the first notification has not been acted upon, a second notification to the user account via the selected second notification channel.

2. The method of claim 1, wherein the first notification relates to an event and selecting the second notification channel is performed based on a correspondence between an identified type of the event and the second notification channel.

3. The method of claim 2, wherein the type of the event is a social event type and the second notification channel is a notification channel that is associated with storage and organizational capabilities.

4. The method of claim 2, wherein the event corresponds to notifications that include a link within the notification, and the second notification channel is a notification channel that provides access to storage and organizational capabilities.

5. The method of claim 1,
wherein the determining that the first notification has not been acted upon during the allotted amount of time is performed by identifying that the user account associated with the first notification has not accessed the content item identified by the notification; and
wherein identifying that the user account associated with the first notification has not accessed the content item identified by the notification includes identifying that the user account associated with the first notification has not clicked on a link indicated in the first notification, not opened an item indicated in the first notification, or not opened a shared folder indicated in the first notification.

6. The method of claim 1, wherein sending the second notification via the second notification channel includes retrieving a previously generated version of the second notification from a queue that is specific to a type of notification channel.

7. The method of claim 1, wherein the first notification is associated with metadata, and the identifying that user account associated with the first notification has not responded to or interacted with the first notification includes querying for the metadata and reading a status associated with the metadata.

8. The method of claim 1,
wherein the determining that the first notification has not been acted upon during the allotted amount of time is performed by identifying that the user account associated with the first notification has not performed the action that addresses the underlying event that triggered the first notification; and
wherein the underlying event that triggered the first notification includes an action occurring that is associated with the user account, and the action to address the underlying event includes the user account clicking on the first notification.

9. The method of claim 1,
wherein the determining that the first notification has not been acted upon during the allotted amount of time is performed by identifying that the user account associated with the first notification has not performed the action that addresses the underlying event that triggered the first notification; and
wherein the underlying event that triggered the first notification includes a second user account sharing a content item with the user account, and the action to address the underlying event includes the user account accessing the content item.

10. The method of claim 1,
wherein the determining that the first notification has not been acted upon during the allotted amount of time is performed by identifying that the user account associated with the first notification has not performed the action that addresses the underlying event that triggered the first notification; and
wherein the underlying event that triggered the first notification includes a change in status of the user account, and the action to address the underlying event includes the user account deleting content items stored within the user account so that the user account is under a storage limit, or upgrading the user account so that the user account is associated with greater storage.

11. The method of claim 1, wherein the first notification channel is a channel that is addressed to one or more specific client devices or client applications, and the second notification channel is not specific to a client device or client application.

12. The method of claim 1, wherein the first notification channel is a notification feed specific to a service provided by the server system.

13. A non-transitory computer readable medium comprising instructions stored thereon, the instructions, when executed by a computing system, cause the computing system to:
send, in response to an event associated with a user account of a content management system, a first notification using a first notification channel;
determine, after an elapsed period, that an action that addresses the event has not occurred;
in response to determining that the action that addresses the event has not occurred, send, using a second notification channel different from the first notification channel, a second notification to a user registered with the user account.

14. The non-transitory computer readable medium of claim 13, wherein at least one of the first notification or the second notification provides shared access to a content item.

15. The non-transitory computer readable medium of claim 13 wherein the first notification channel is a notification feed specific to a service provided by the content management system.

16. The non-transitory computer readable medium of claim 13,
wherein the user account is a first user account; and
wherein the event associated with a first user account includes a second user account sharing a content item with the first user account, and the action that addresses the event includes the first user account accessing the content item.

17. A content management system comprising:
an application server configured to send information regarding an event that took place at the application server;
a notifications data store configured to store a record of a first notification, the record including a status field, the first notification having been sent responsive to the event that took place at the application server;
a notification server configured to:
determine, after an allotted amount of time, a status from the status field included with the record of the first notification, wherein the status field was modified responsive to a determined status of the first notification, and in response to determining the status matches a state indicating the first notification is still pending, send a second notification to a user registered with the content management system.

18. The system of claim 17, wherein the notification server is further configured to send the second notification using a second notification channel different from a first notification channel that was used to send the first notification.

19. The system of claim 18, wherein the first notification channel is a notification feed specific to a service provided by the content management system.

20. The system of claim 17, wherein the event that took place at the application server includes a second user account sharing, using a link, a content item with the user registered with the content management system, and wherein the status of the first notification is based upon whether the link has been utilized to access the content item.

* * * * *